United States Patent [19]

Chassé et al.

[11] Patent Number: 5,742,511
[45] Date of Patent: Apr. 21, 1998

[54] MODELS FOR COMPUTER INTEGRATED MANUFACTURING

[75] Inventors: Daniel Chassé, St. Constant; Bert van den Berg, Gloucester, both of Canada

[73] Assignee: National Research Council of Canada, Ottawa, Canada

[21] Appl. No.: 494,526

[22] Filed: Jun. 26, 1995

[30] Foreign Application Priority Data

May 29, 1995 [CA] Canada ................................ 2150432

[51] Int. Cl.$^6$ .............................. G06F 19/00; G06G 7/64; G06G 7/66
[52] U.S. Cl. ................... 364/468.04; 364/468.03; 364/468.17
[58] Field of Search .................... 364/468, 469, 364/468.03, 468.04, 468.15, 468.16, 468.17; 395/964

[56] References Cited

U.S. PATENT DOCUMENTS

| | | | |
|---|---|---|---|
| 4,660,149 | 4/1987 | Lissalde et al. | 117/15 |
| 4,936,862 | 6/1990 | Walker et al. | 623/23 |
| 5,111,516 | 5/1992 | Nakano et al. | 382/14 |
| 5,121,334 | 6/1992 | Riley et al. | 364/474.05 |
| 5,184,306 | 2/1993 | Erdman et al. | 364/474.05 |
| 5,189,626 | 2/1993 | Colburn | 364/474.24 |
| 5,275,768 | 1/1994 | Inaba et al. | 264/40.1 |
| 5,350,547 | 9/1994 | Yamaguchi et al. | 264/40.1 |
| 5,402,367 | 3/1995 | Sullivan et al. | 364/578 |
| 5,408,405 | 4/1995 | Mozumder et al. | 364/151 |
| 5,452,219 | 9/1995 | Dehoff et al. | 364/474.05 |
| 5,460,758 | 10/1995 | Langer et al. | 264/401 |
| 5,471,541 | 11/1995 | Burtnyk et al. | 382/153 |
| 5,587,912 | 12/1996 | Andersson et al. | 364/468.04 |
| 5,630,981 | 5/1997 | Hull | 264/401 |

OTHER PUBLICATIONS

R.J. Cripps, et al; A Geometric Characterization of Springback in Drawn Panels; Math Engng Ind., Vol. 3, No. 3, pp. 205–214, 1991.

Barry D. Smith; Do–It–Yourself Adaptive Control?; Manufacturing Engineering, pp. 63–64, May 1992.

R.D. Webb, et al; A Transfer Function Description of Sheet Metal Forming for Process Control; Transactions of the ASME, vol. 116, pp. 44–52, 1994.

W.R. Dinauer, et al; Error Compensation Algorithms for Sculptured Surface Production, Transactions of the ASME, vol. 116, pp. 144–152, 1994.

R. M. H. Cheng, et al; The Differential Geometric Modelling of Compressor Blades; Proceedings of ACC Conference (Maryland USA), Jun. 1994.

Sabri Cetinkunt, et al; Position Error Compensation of Robotic Contour End–Milling; Int J. Mach. Tools Manufact., vol. 30, No. 4, pp. 613–627, 1990.

Yotaro Hatamura, et al; A Fundimental Structure for Intelligent Manufacturing; Intelligent Manufacturing, vol. 15, No. 4, pp. 266–272, Oct. 1993.

A. Wirtz, et al; From Unambiguously Defined Geometry to the Perfect Quality Control Loop; Annals of the CIRP, vol. 42/1/1993, pp. 615–619, 1993.

(List continued on next page.)

*Primary Examiner*—Reba I. Elmore
*Assistant Examiner*—Robert J. Dolan
*Attorney, Agent, or Firm*—Neil Teitelbaum and Associates

[57] ABSTRACT

A method is disclosed for using a numerical method such as finite elements to adjust a model of an object for use with computer integrated manufacturing. The adjusted model is useful in correcting errors introduced in manufacturing. The method requires the model to be available in an electronic form. An object produced based on the model is measured to produce an electronic facsimile. The two electronic representations are then correlated and some differences between them are found. With one or more of the differences, a phenomenon that would have caused the difference(s) is determined and applied in an inverse manner to the model. A system for carrying out the invention is also disclosed.

20 Claims, 5 Drawing Sheets

OTHER PUBLICATIONS

Mark C. Gerchman; Compensation of Residual Form Errors in Precision Machined Components; SPIE Vo 1573 Commercial Applications of Precision Manufacturing at the Sub–micron Level, pp. 201–239, 1991.

Gary Nobel, et al; Real–time Compensation for Tool Form Errors in Turning Using Computer Vision; SPIE vol. 1335 Dimensional Stability; pp. 186–193, 1990.

D. Schemoeckel, et al; Springback Reduction in Draw––Bending Process of Sheet Metals; Institute for Production Technology and Forming Machines, pp. 339–342, Jan. 15, 1993.

N. Duffie, et al; CAD–Directed Inspection, Error Analysis and Manufacturing Process Compensation Using Tricubic Solid Databases; Annals of the CIRP vol. 37/1/1988, pp. unknown, 1988.

1

MODELS FOR COMPUTER INTEGRATED MANUFACTURING

FIELD OF THE INVENTION

This invention relates generally to a method of improving computer integrated manufacturing and more particularly to a method and system for improving the models used in computer integrated manufacturing based on previously manufactured objects.

BACKGROUND OF THE INVENTION

In computer integrated manufacturing, electronically controlling a manufacturing process such as layered manufacturing—an example of which is stereo lithography—allows for greater repeatability. A series of control signals is determined which control the manufacturing process to produce an object. This repeatability allows for high quality mass production of the object by repeatedly applying the series of control signals to the manufacturing process. For example, in a computer controlled stereo lithography process, the control signals may control laser spot, size, location, orientation, depth of penetration, and speed of a laser beam.

A model of the object to be manufactured forms the basis of the manufacturing process. The model consists of descriptors that define features of an object that is to be manufactured. These descriptors may relate to features of the object such as shape and/or pattern. Alternatively, the model may be in an electronic form. Generally, the electronic model is formed with computer aided design tools.

An electronic model must reflect a desired outcome of a manufacturing process. Often, a model will provide shape and size related information to a manufacturing process such as layered manufacturing. Alternatively, or in addition models may provide information relating to colour, material structure, or finish. The model is then used to create a series of control signals for a process or, alternatively, for each of several processes. This transformation occurs in the absence of any feedback from the manufacturing process. The use of computer integrated manufacturing allows for automation in the transition from model to repeatable manufacturing process.

It is known that when using an electronic model, a manufactured object produced by computer integrated manufacturing is frequently dissimilar to the model. There are many known causes for the dissimilarity such as calibration errors in the manufacturing equipment, non linearity in the manufacturing process, shrinkage in the manufactured object, wear on the manufacturing equipment, differences in manufacturing materials from a previous manufactured object to the manufactured object, and others.

PRIOR ART

In the past, models were converted into control sequences for computer integrated manufacturing. One or more objects were then manufactured. These manufactured objects were inspected to determine any flaws and the control sequences were improved manually. This was repeated until the output of the process, a manufactured object, was acceptable. This process was found to be time consuming and required skilled individuals to modify the control signals.

Automated approaches have been developed using sensor-feedback provided to a processor during manufacturing for modifying the control sequences used in computer integrated manufacturing. These approaches have been found to suffer from inadequacies such as sensor calibration and alignment errors which sometimes are aggravated by the conditions within many manufacturing environments; interference with sensor operation in some manufacturing environments; overcorrection and undercorrection which can result in a very low yield. Also, it has been found that these approaches may fail to take into account other manufacturing methods for correcting the problems. These automated error correction methods have, in general, been used infrequently—often, with little or no success.

It would be advantageous to provide a corrected model for use with computer integrated manufacturing.

OBJECT OF THE INVENTION

It is, therefore, an object of the present invention to provide a method of improving an object manufactured based on an electronic model.

It is, therefore, an object of the present invention to provide a method of transforming an electronic model for an object capable of manufacture with computer integrated manufacturing based on a previous manufactured object.

SUMMARY OF THE INVENTION

In a first broad embodiment this invention seeks to provide a method for adjusting a first electronic model of an object. The method comprises the steps of producing the object based on the first electronic model; producing an electronic facsimile of the object; locating at least a difference between the electronic facsimile of the object and a second electronic model by comparing the electronic facsimile of the object to the second electronic model; determining at least one phenomenon that would have caused said at least a difference between the electronic facsimile of the object and the second electronic model; and applying said at least one phenomenon in an inverse manner to the first electronic model of the object so as to produce an at least partially corrected electronic model for use in manufacturing.

In accordance with another embodiment the invention, there is provided a method of adjusting a first electronic model of an object. The method comprises the steps of producing the object based on the first electronic model; producing an electronic facsimile of the object; locating at least a difference between the electronic facsimile of the object and a second electronic model by comparing the electronic facsimile of the object to the second electronic model; determining at least one phenomenon that would have caused said at least a difference between the electronic facsimile of the object and the second electronic model; determining the proportion of correction provided based on a list of past corrections and the at least a difference; and applying said at least one phenomenon scaled by the proportion of correction in an inverse manner to the first electronic model of the object so as to produce an at least partially corrected electronic model for use in manufacturing.

In accordance with another aspect of the invention, there is further provided a system for adjusting a first electronic model of an object. The system comprises means for producing a facsimile of the object; means for locating at least a difference between the facsimile of the object and a second electronic model of the object by comparing the facsimile of the object to the second electronic model of the object; means for determining at least one phenomenon that would have caused said at least a difference between the facsimile of the object and the second electronic model of the object;

and means for applying said at least one phenomenon in an inverse manner to the first electronic model of the object so as to produce an at least partially corrected model.

In accordance with another embodiment of the invention, there is further provided a method of adjusting an electronic model based on an object. The method comprises the steps of providing an electronic facsimile of the object; locating at least a difference between the electronic facsimile of the object and the electronic model by comparing the electronic facsimile of the object to the electronic model; determining at least one phenomenon that would have caused said at least a difference between the electronic facsimile of the object and the electronic model; and applying said at least one phenomenon to the electronic model so as to produce a further electronic model.

Preferably, the at least a difference is located by first locating similarities between the electronic model and the electronic facsimile and using said similarities to correlate the electronic model and the electronic facsimile and then comparing the electronic model and the electronic facsimile for at least a difference.

Preferably, computer integrated manufacturing is further used to produce a resulting object based on the further electronic model.

In accordance with another aspect of the invention, there is provided a method of using computer integrated manufacturing to substantially copy an object. The method comprises the steps of producing an electronic facsimile of the object; locating at least a difference between the electronic facsimile of the object and the electronic model by comparing the electronic facsimile of the object to the electronic model; determining at least one phenomenon that would have caused said at least a difference between the electronic facsimile of the object and the electronic model; applying said at least one phenomenon to the electronic model so as to produce a further electronic model; transforming the further electronic model into a model usable in computer aided design; and providing the further electronic model to computer integrated manufacturing means to produce a resulting object based on the further electronic model.

BRIEF DESCRIPTION OF THE DRAWINGS

Exemplary embodiments of the invention will now be described in conjunction with the following figures in which.

DETAILED DESCRIPTION

Figure 1:
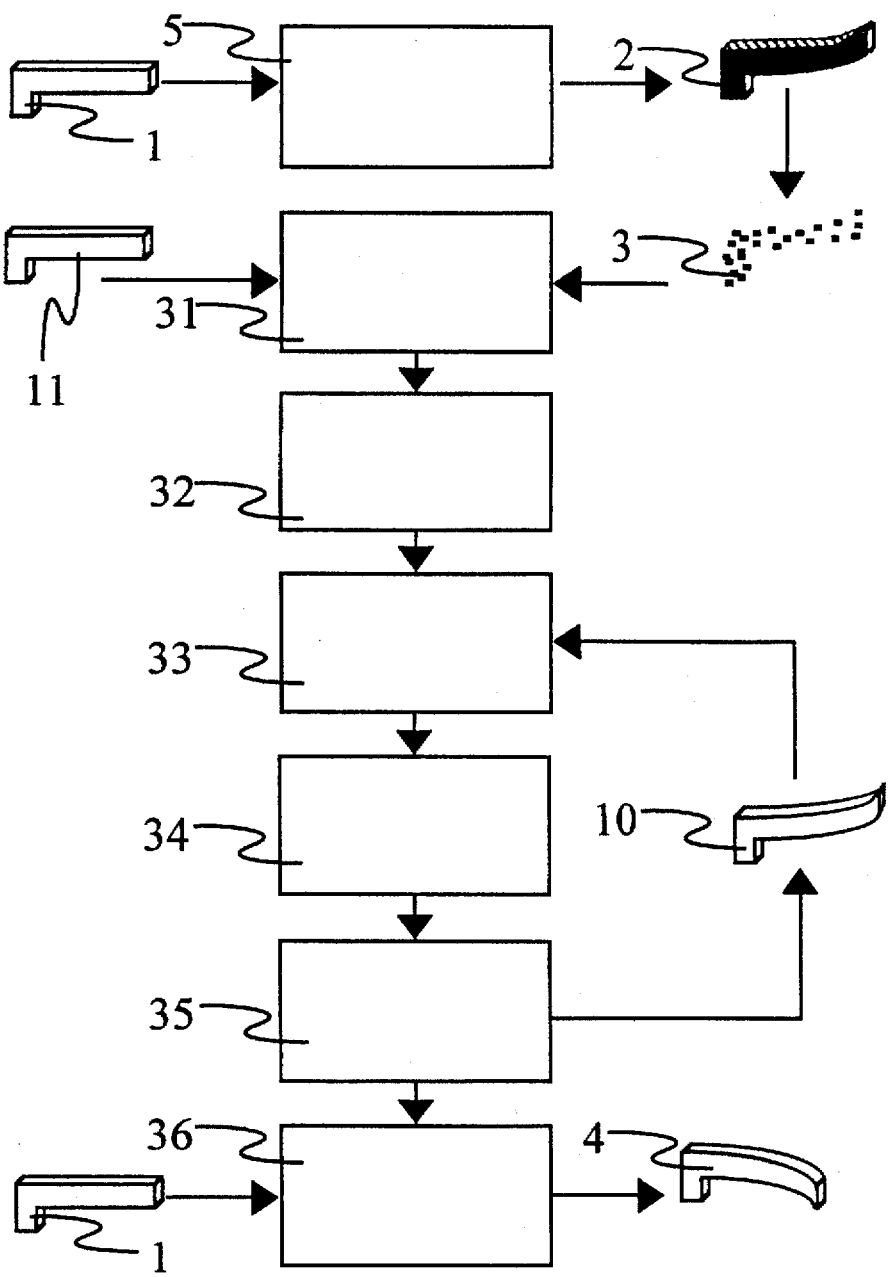
FIG. 1 is a block diagram of an embodiment of the method of this invention.

In use the invention is applicable to computer integrated manufacturing and computer aided design. A use of the method of this invention will now be presented examining each step in more detail and referring first to FIG. 1 in which a block diagram of an embodiment of a method according to this invention is presented. The method is shown as a series of steps utilized to achieve a result.

Figure 2:
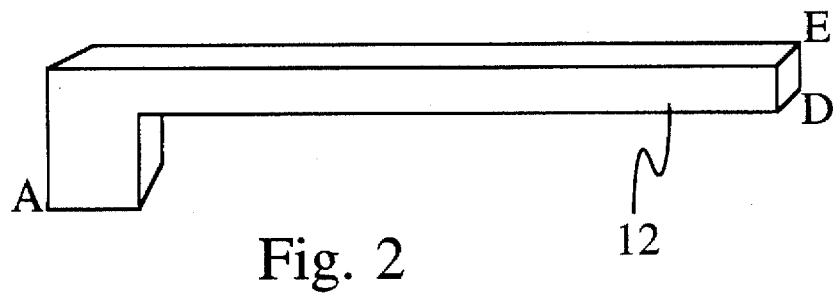
FIG. 2 is a designed electronic model.

A designed electronic model 12 in the form of graphical information is shown in FIG. 2. This model represents a physical shape to be manufactured. Ideally the model will be representative of vertices, edges and surfaces of the object to be manufactured as shown in FIG. 2 where only the visible surfaces have been shown for clarity.

The computer integrated manufacturing model 1 is transformed into control parameters which are used in computer integrated manufacturing. A computer integrated manufacturing means 5 in the form of a layered manufacturing machine produces an object 2 which desirably, has a close correlation to the designed electronic model 12.

Figure 3:
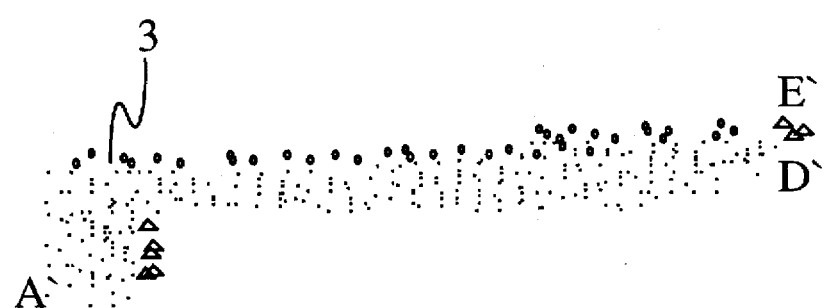
FIG. 3 is a facsimile of an object.

By electronically scanning the object 2, an electronic facsimile 3, shown in FIG. 3, in the form of a series of points representing the measured locations of points on or near the surfaces of object 2 can be provided. Alternatively, when a coordinate measurement machine is used the points may represent points a distance away from the surface of the object. These points typically will not be preseparated, but for clarity the points are generally shown as dots for those surfaces which are facing out of the page, circles for those surfaces facing the top of the page and triangles for those surfaces facing the right side of the page. This representation is solely for this example; such distinctions between the points likely will be absent from the data. The three remaining surface orientations (for the right angled object shown) have been omitted.

The designed electronic model 12 and the facsimile 3 consisting of a plurality of data points are provided as inputs at the step labeled as 31. Clearly, if the manufacturing process has succeeded in producing the object modeled, a close correlation between the two inputs will be observed.

Figure 2A:
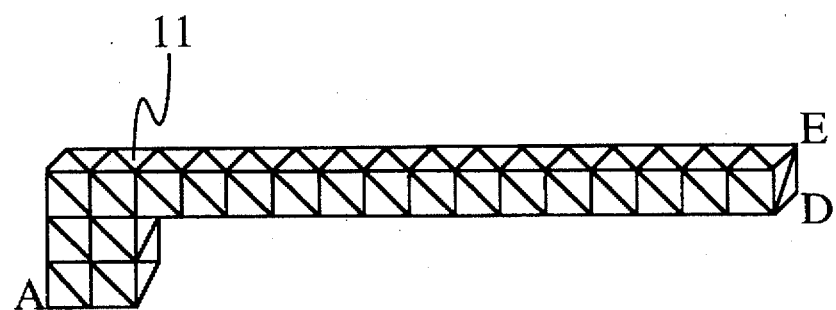
FIG. 2a is a constructed electronic model.

At the step labeled as 32, the designed electronic model 12 is transformed into a constructed electronic model 11 as shown in FIG. 2a which is compared to the facsimile 3. This is accomplished using analysis in the form of finite element analysis, finite volume analysis, finite difference analysis, or another form of numerical analysis. Using Finite element analysis, the designed electronic model 12 is divided into volume elements of a predetermined type—having a predetermined shape and order. It is anticipated that some designed electronic models 12 will already be in the form of a plurality of volume elements and will, therefore, not require transformation being both the designed electronic model 12 and the constructed electronic model 11.

One volume element type is a tetrahedron in linear form having 4 nodes (one at each vertex); more nodes would be present for a tetrahedron in a higher order form. Other volume elements and orders may be chosen. The designed electronic model 12 is subdivided into a plurality of volumes each being a volume element. These volume elements should be disposed so as to share edges and faces but not volume. In order to improve performance, the volume elements, once determined, optionally may be sorted based on a predetermined criteria, such as center location, and stored.

As an example, consider that the predetermined type of element is a first order tetrahedron having four triangular faces, each surface is divided into a plurality of planar triangular areas each having 3 nodes as shown in FIG. 2a and bounding a volume. These volume elements are disposed so as to share edges and faces but not volume. In subdividing rounded surfaces using a facet having a linear form, small errors will be introduced; the use of higher order forms or smaller volumes enables reduction of the error. From the surface facets, volume elements must be constructed with the properties described above. Standard methods exist for generating surface facets or volume elements from CAD models.

To each node of each exterior facet of the constructed electronic model 11, a point contained in the facsimile 3 may be associated. This association is typically performed by selecting the nearest point to the node but may also be performed using a statistical method such as the basic or mean square function. It has been found that limiting the allowable distance from a point to an associated node greatly improves the results according to this method. Therefore, a predetermined maximum distance is selected; a node and a point separated by a distance greater than the predetermined maximum distance are prevented from being associated together. When using volume elements in the form of tetrahedrons, each triangular facet of the constructed electronic model 11 is associated with a maximum of three points. Further, it was found that disallowing a point from being associated with more than one facet improves the results. Therefore, when a point would be associated with two different nodes, the point is selected to be associated with one of the nodes and the other node is left with no associated point.

For each exterior facet associated with a non zero number of associated points, using the mean of the at least one associated point and the mean of the nodes, an alignment error can be determined in the form of an x, y, and z offset. Individual nodal alignment errors as well as an average of the alignment errors will provide a basis for correlating the constructed electronic model 11 and the electronic facsimile 3. Selecting the facet which, when correlated to the associated points results in the lowest overall mean facet error allows for a possible correlation. The electronic facsimile 3 is then translated and rotated so as to correlate the selected facet from the constructed electronic model 11 and its associated points from the electronic facsimile 3. Alternatively, the constructed electronic model 11 can be rotated and translated.

An alternative method of correlation is available where the object has distinguishable corners, as in the example of FIG. 2. Corners and edges can be aligned so as to best correlate the electronic facsimile 3 to the constructed electronic model 11. Once this initial correlation is performed, the points can be associated with the nodes and a facet can be selected. The electronic facsimile 3 is then translated and rotated so as to correlate the selected facet from the constructed electronic model 11 and its associated points from the electronic facsimile 3.

At the step labeled as 33, the selected exterior facet is marked as fixed. Adjacent exterior facets are examined and if their alignment error is within a predetermined tolerance, they too are fixed. This is continued until every fixed facet is bounded by fixed facets and facets with alignment errors outside of the predetermined tolerance. In this fashion, the exterior facets which will be corrected are determined. It has been found that the predetermined tolerance must be selected to ensure convergence and may be larger than the user selected tolerance for manufacturing.

The constructed electronic model 11 and the facsimile 3 thus correlated are shown in FIG. 2 and FIG. 3 wherein the edges A and A' respectively are correlated. The superposition of the facsimile 3 onto the constructed electronic model 11 based on this correlation of A and A' produces the result shown in FIG. 4.

At the step labeled as 34, the constructed electronic model 11 and the facsimile 3 are compared for differences. Any differences found are compared to the predetermined tolerance to filter errors which are acceptable. For all facets which are outside the predetermined tolerance and, therefore, to be corrected, the nodal error, ne, is calculated which is the distance of each node from a location of its associated point. Using the nodal errors of the nodes of a facet, the facet error, fe, can be calculated for each facet.

At the step labeled as 35, for those errors which are beyond the predetermined tolerance such as the differences between D and D' and E and E' respectively, a phenomenon such as force, temperature or the like, which could result in at least one error, is determined.

Figure 4:
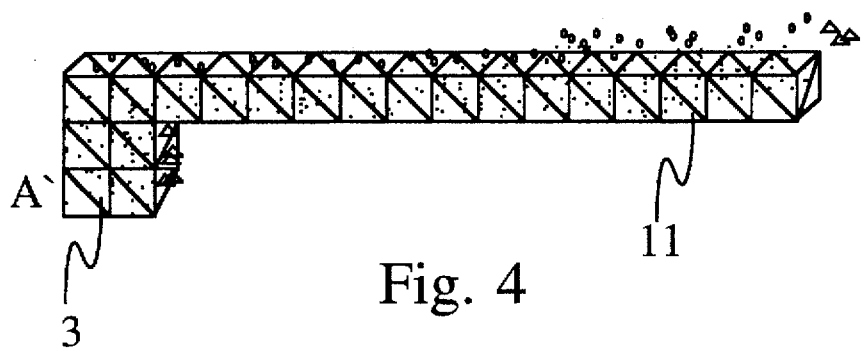
FIG. 4 is a constructed electronic model and a facsimile of an object correlated according to the method of this invention.

In the example of FIG. 4, an upward force F at D produces the variation in shape observed at both D' and E'; the force F, calculated based on the known properties of the material used in manufacture, is determined which when applied at D results in the variation. At least one calculated force is then applied to the constructed electronic model 11 to form a further electronic model 10. The at least one calculated force which is applied is also stored for later use.

This further electronic model 10 is then provided with the facsimile 3 and the selected facet as the inputs to the step labeled as 33 in order to verify the results. At the step labeled as 33, the selected facet is fixed as are all adjacent facets which are within the predetermined tolerance. If all facets are fixed, then the further electronic model 10 and the facsimile 3 are within a predetermined tolerance of one another and no differences will be found in subsequent steps. Otherwise, at the step labeled as 34 at least some remaining differences are determined.

The method continues returning from the step labeled as 35 to the step labeled as 33 for a predetermined finite number of tries, or until no improvement occurs in the further electronic model 10; the method then proceeds to the step labeled as 36.

Figure 5:
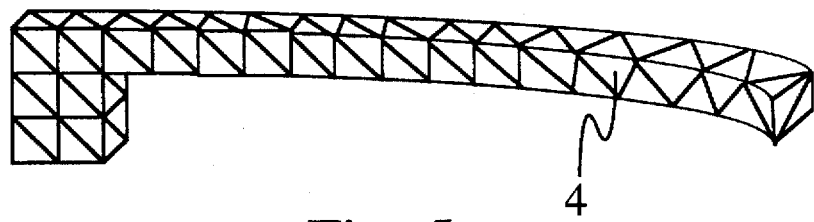
FIG. 5 is a partially corrected electronic model.

At the step labeled as 36, any phenomenon in the form of any stored at least one force which was applied to a model at F5, is applied in an inverse manner to the computer integrated manufacturing model 1 in order to produce an at least partially corrected model 4 as shown in FIG. 5. In the example of FIG. 4, the force F is applied to the computer integrated manufacturing model 11 in downward direction (being the force −F) at D thereby producing the at least partially corrected model 4.

This partially corrected model 4 may be provided to computer integrated manufacturing means in the form of layered manufacturing equipment to produce a more accurate representation of the object 2 based on the constructed electronic model 11.

The present invention can be applied when the constructed electronic model 11 and the computer integrated manufacturing model 1 are identical or a same one model.

The present invention can also be applied when the model is based on qualities achievable applying other phenomena some examples of which are temperature or light.

In an alternative embodiment, the phenomenon in the form of a force F can be calculated based on a general material. As the electronic model is modified and not the control sequences, the resulting control sequences once transformed from the at least partially corrected model, reflect the correct values for the material used in manufacture. In this embodiment, this invention allows for the correction of a model such that the manufacturing process may then be applied to numerous manufacturing materials.

Figure 6:
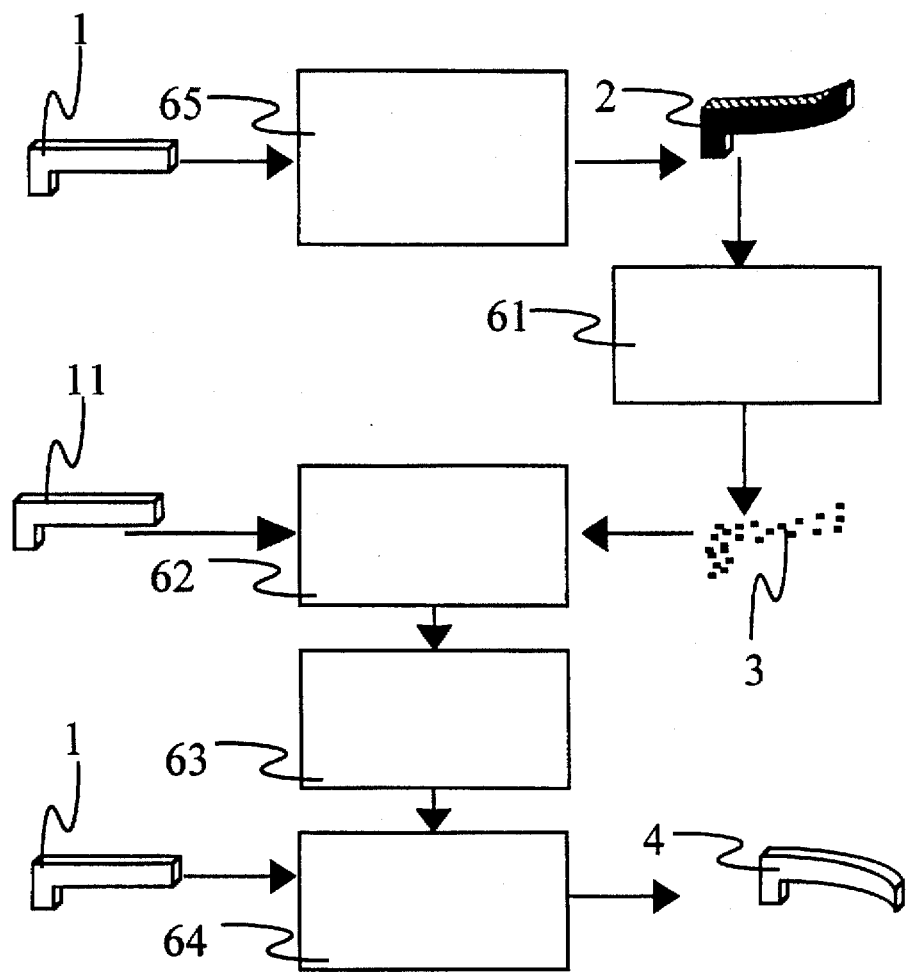
FIG. 6 is a block diagram of a system according to this invention.

The invention can be carried out using a conventional computer integrated manufacturing apparatus or an apparatus designed for the purpose of carrying out this invention as shown in FIG. 6.

A system for adjusting a computer integrated manufacturing model 1 of an object is shown wherein means for producing a facsimile of the object 61 produces a facsimile 3 of a physical object 2. This facsimile 3 and a constructed electronic model 11 are provided to means for locating a correlation 62 between the facsimile 3 of the physical object 2 and the constructed electronic model 11 and means for locating a difference 63 between the facsimile 3 and the constructed electronic model 11. The a difference is provided to a means 64 for determining at least one phenomenon that would have caused said at least difference between the facsimile 3 and the constructed electronic model 11 and applying said at least one phenomenon in an inverse manner to the computer integrated manufacturing model 1 thereby producing an at least partially corrected model 4.

In a further embodiment the system comprises means 65 for manufacturing an object based on the corrected model 4.

In a further embodiment of the system the constructed electronic model 11 and the computer integrated manufacturing model 1 are identical or a same one model.

Figure 7:
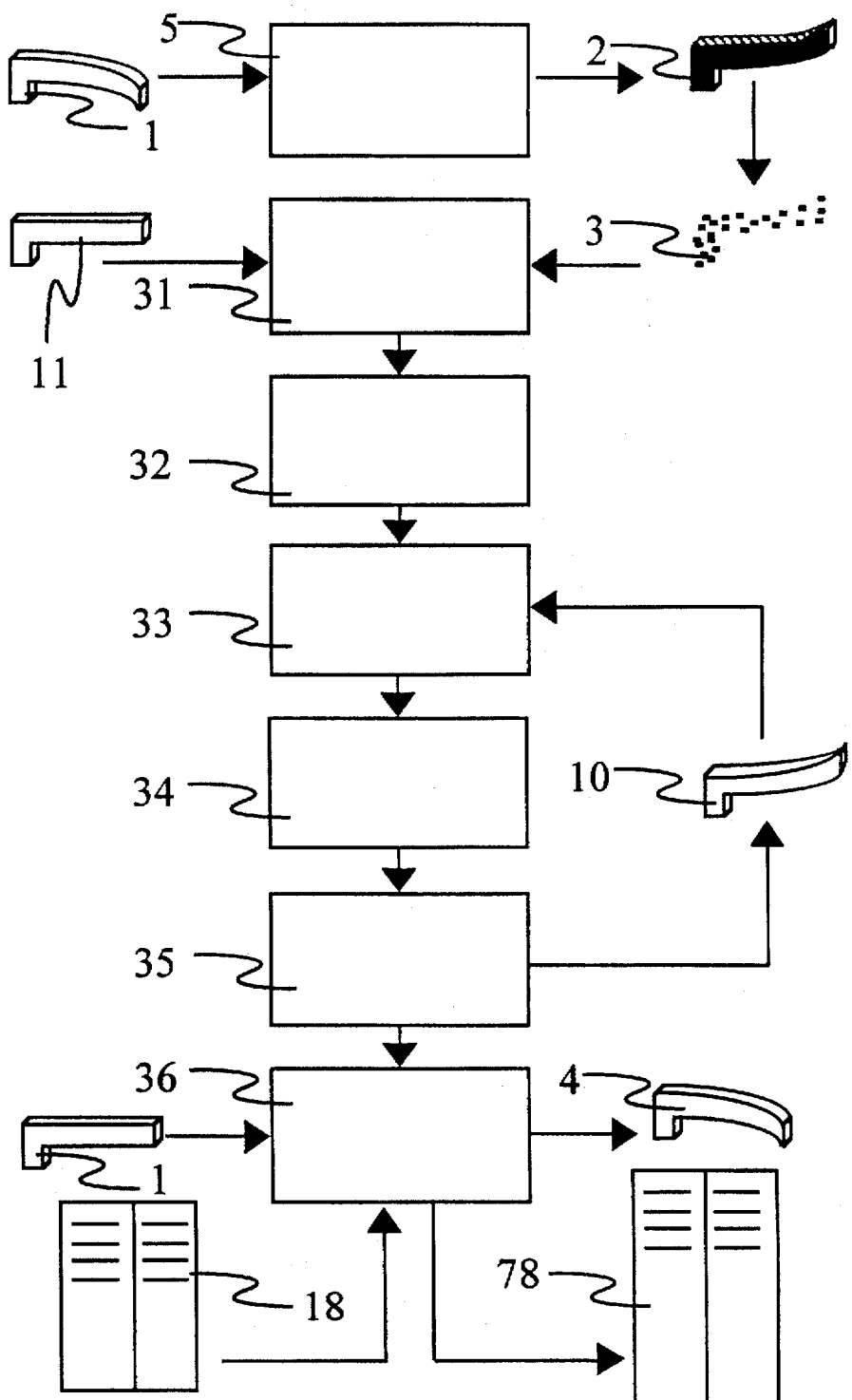
FIG. 7 is a block diagram of an alternate embodiment of the method of this invention.

In another embodiment of this invention, shown in FIG. 7, the method can be applied in an iterative fashion resulting in an at least partially corrected model based on a constructed electronic model 11. The at least partially corrected model 4 can be verified and improved by successive applications of the present embodiment of this invention.

A computer integrated manufacturing model 1 is transformed into control parameters which are used in computer integrated manufacturing. A computer integrated manufacturing means 5 in the form of a stereo lithography apparatus or other layered manufacturing machine produces an object 2 which desirably, has a close correlation to the computer integrated manufacturing model 1.

By electronically scanning the object 2, an electronic facsimile 3 in the form of a series of points representing the measured locations of points on or near the surfaces of the object 2 can be provided. The constructed electronic model 11, the facsimile 3 consisting of a plurality of data points are provided as inputs at the step labeled as 31.

At the step labeled as 32, the constructed electronic model 11 is compared to the facsimile 3. This is accomplished using finite element analysis, numerical analysis, or another form of analysis. The method applied for steps labeled as 32 through 35 is as described in the preferred embodiment.

At the step labeled as 36, a list 18 of past corrections to the computer integrated manufacturing model 1 is provided. Where no past corrections have been performed, the list will be empty. The list 18 of past corrections to the computer integrated manufacturing models is examined to determine a proportion of correction in the form of a correlation between applied phenomena and their corrective effect. For example, in a linear system the proportion of correlation is the amount of correction necessary in the last iteration divided by the amount of correction which actually occurred; this is the inverse of the percent corrected. The any phenomenon in the form of any stored at least one force which was applied to a model at the step labeled as 35, is applied in an inverse manner with the proportion of correction added for enhancing (or limiting) the corrective effect to the computer integrated manufacturing model 1 in order to produce an at least partially corrected model 4 as shown in FIG. 5. In order to operate in an iterative fashion, the method must also produce a list of corrections 78 to be provided to further iterations.

For example, when only one phenomenon has been applied to the computer integrated manufacturing model 1 and the at least partially corrected model 4 only corrected 80% of the error, then the any phenomenon in the form of any stored at least one force which was applied to a model at the step labeled as 35, is applied in an inverse manner with a proportion of correction of 125% to the computer integrated manufacturing model 1 in order to produce an at least partially corrected model 4 as shown in FIG. 5. In this way, successive iterations can be used to produce better models for manufacturing.

Figure 4A:
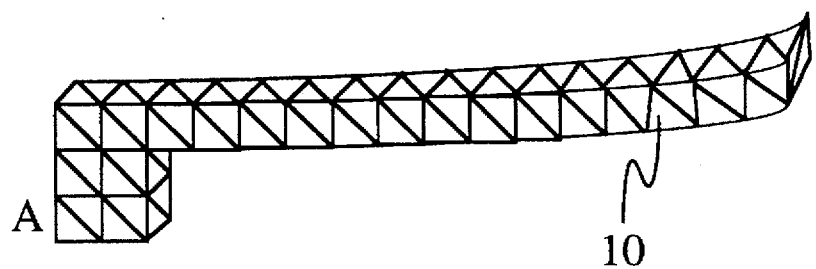
FIG. 4a is a further electronic model.

This method, in part, may also be used to modify a constructed electronic model 11 for design or manufacturing based on an object 2. In this application, an electronic facsimile 3 of the object 2 is provided as is a constructed electronic model 11. Steps labeled as 32 through 35 are applied according to the method of this invention. The further electronic model 10 as shown in FIG. 4a is substantially correlated to the facsimile 3 and is provided as an output. Objects substantially similar to the object 2 can be manufactured by providing the further electronic model 10 to a computer integrated manufacturing means 5 in the form of a layered manufacturing machine.

When the constructed electronic model 11 is based on a designed electronic model 12 in the form of a CAD model, the further electronic model 10 can further be used to transform the designed electronic model 12 into a CAD model in the form of surface information for the object 2. Each exterior facet node in the constructed electronic model 11 has an corresponding surface location in the designed electronic model 12. The transformation can be accomplished by applying any changes applied to each node of the constructed electronic model 11 in producing the further electronic model 10 to the surface of the designed electronic model 12 at each corresponding location to produce a further CAD model. In this fashion, the smooth surface of the CAD model can be substantially maintained; however, the application of this method may reduce the surface quality of the further CAD model. Objects substantially similar to the object 2 can be manufactured by providing the further CAD model to a computer integrated manufacturing means 5 in the form of a layered manufacturing machine.

The further CAD model has many advantages. It is particularly well suited to prototyping as it can be reworked, or altered slightly in order to produce different results. Further, the application of this method allows for the production of detailed CAD models based on physical objects which need not be machine manufactured. In fact the objects may not be manufactured, may be manufactured by hand, or may be manufactured in many other ways. Once the prototype is provided, the application of this method allows for mass production and variation of and corrections to objects being manufactured.

Numerous other embodiments may be envisaged without departing from the spirit and scope of the invention.

What we claim is:

1. A method of adjusting a first electronic model of an object comprising the steps of:

a) providing the object based on the first electronic model;

b) producing an electronic facsimile of the object;

c) providing a second electronic model of an object;

d) locating at least a difference between the electronic facsimile of the object and the second electronic model by comparing the electronic facsimile of the object to the second electronic model;

e) determining at least one phenomenon that would have caused said at least a difference between the electronic facsimile of the object and the second electronic model; and f) applying said at least one phenomenon in an inverse manner to the first electronic model of the object so as to produce an at least partially corrected electronic model for use in manufacturing.

2. The method of claim 1 wherein the first electronic model and the second electronic model are models of a same object.

3. The method of claim 1 wherein the at least a difference is located using numerical analysis.

4. The method of claim 1 wherein the at least a difference is located by first locating similarities between the second electronic model and the electronic facsimile and using said similarities to correlate the second electronic model and the electronic facsimile and then comparing the second electronic model and the electronic facsimile for at least a difference.

5. The method of claim 1 wherein computer integrated manufacturing is further used to produce a resulting object based on the partially corrected model.

6. A method of adjusting a first electronic model of an object as defined in claim 1 wherein the phenomenon is one of force, heat, and radiation.

7. A method of adjusting a first electronic model of an object comprising the steps of:

a) providing the object based on the first electronic model;

b) producing an electronic facsimile of the object;

c) providing a second electronic model of an object;

d) locating at least a difference between the electronic facsimile of the object and the second electronic model by comparing the electronic facsimile of the object to the second electronic model;

e) determining at least one phenomenon that would have caused said at least a difference between the electronic facsimile of the object and the second electronic model;

f) determining a scaling factor based on a proportion of correction provided based on a list of past corrections and the at least a difference; and g) applying said at least one phenomenon scaled by the scaling factor in an inverse manner to the first electronic model of the object so as to produce an at least partially corrected electronic model for use in manufacturing.

8. The method of claim 7 wherein the at least a difference is located using numerical analysis.

9. The method of claim 7 wherein the at least a difference is located by first locating similarities between the second electronic model and the electronic facsimile and using said similarities to correlate the second electronic model and the electronic facsimile and then comparing the second electronic model and the electronic facsimile for at least a difference.

10. The method of claim 7 wherein the object is provided at least using computer integrated manufacturing.

11. The method of claim 7 wherein computer integrated manufacturing is further used to produce a resulting object based on the partially corrected electronic model.

12. A system for adjusting a first electronic model of an object comprising:

a) means for producing a facsimile of the object;

b) means for locating at least a difference between the facsimile of the object and a second electronic model of the object by comparing the facsimile of the object to the second electronic model of the object;

c) means for determining at least one phenomenon that would have caused said at least a difference between the facsimile of the object and the second electronic model of the object; and d) means for applying said at least one phenomenon in an inverse manner to the first electronic model of the object so as to produce an at least partially corrected model.

13. The system of claim 12 further comprising means for manufacturing the object based on the first electronic model.

14. The system of claim 12 further comprising means for locating a correlation between the facsimile of the object and the second electronic model of the object by comparing the facsimile of the object to the second electronic model of the object.

15. The system of claim 14 further comprising means for manufacturing an object based on the corrected model.

16. A method of adjusting an electronic model based on an object comprising the steps of:

a) producing an electronic facsimile of the object;

b) locating at least a difference between the electronic facsimile of the object and the electronic model by comparing the electronic facsimile of the object to the electronic model;

c) determining at least one phenomenon that would have caused said at least a difference between the electronic facsimile of the object and the electronic model; and d) applying said at least one phenomenon to the electronic model so as to produce a further electronic model.

17. The method of claim 16 wherein the at least a difference is located by first locating similarities between the electronic model and the electronic facsimile and using said similarities to correlate the electronic model and the electronic facsimile and then comparing the electronic model and the electronic facsimile for at least a difference.

18. The method of claim 16 wherein computer integrated manufacturing is further used to produce a resulting object based on the further electronic model.

19. The method of claim 16 wherein the further electronic model is transformed into a model usable in computer aided design.

20. A method of using computer integrated manufacturing to substantially copy an object comprising the steps of:

a) providing an electronic model of a second object having similar geometrical features to those of the object;

b) producing an electronic facsimile of the object;

c) locating at least a difference between the electronic facsimile of the object and the electronic model by comparing the electronic facsimile of the object to the electronic model;

d) determining at least one phenomenon that would have caused said at least a difference between the electronic facsimile of the object and the electronic model;

e) applying said at least one phenomenon to the electronic model so as to produce a further electronic model;

f) transforming the further electronic model into a model usable in computer aided design; and g) providing the further electronic model to computer integrated manufacturing means to produce a resulting object based on the further electronic model.

* * * * *